April 6, 1943.  H. S. JONES  2,315,714
MEASURING APPARATUS
Filed June 12, 1942

INVENTOR.
HARRY S. JONES
BY G. B. Spangenberg
ATTORNEY.

Patented Apr. 6, 1943

2,315,714

UNITED STATES PATENT OFFICE 2,315,714

MEASURING APPARATUS

Harry S. Jones, Washington, D. C., assignor to The Brown Instrument Company, Philadelphia, Pa., a corporation of Pennsylvania Application June 12, 1942, Serial No. 446,831

31 Claims. (Cl. 171—95)

The present invention relates to apparatus having especial utility in measuring the magnitude and changes in magnitude of a variable condition, and more specifically, to self balancing electrical apparatus having particular utility in measuring the magnitude of electrical, thermal, chemical, physical, and mechanical quantities or qualities such as electric current, temperature, pressure, flow, or hydrogen ion content. The present invention is particularly useful in pyrometric apparatus for measuring voltage changes in thermocouples which are exposed to variations in temperature or radiant energy. The invention is also useful in many other different and varied applications among which may be included measuring electrolytic conditions of industrial cells and in particular the determination of hydrogen ion content values of cells wherein it is desired to measure small voltage variations accurately and automatically.

A general object of the invention is to provide in measuring apparatus of the type referred to above means for automatically compensating for the disturbing influence of external factors on the accuracy of the measurement obtained.

A specific object of the invention is to provide in measuring apparatus of the type referred to above means for automatically compensating for the disturbing influence of external factors such as variations in the ambient temperature to which the apparatus is subjected and variations in voltage of the energizing source which is utilized for supplying electrical current to the apparatus.

Another specific object of the invention is to provide measuring apparatus of the pyrometric type utilizing a thermoelectric element having an improved means for compensating for variations in temperature in the cold junction of the thermoelectric element so that accurate measurements may be obtained at all times over a wide range of cold junction temperatures.

A further specific object of the invention is to provide a pyrometer potentiometer having an improved means for compensating for variations in temperature of the cold junctions of the thermocouple.

A still further specific object of the invention is to provide a pyrometer potentiometer having improved means for compensating for variations in temperature of the cold junctions of the thermocouple and also incorporating means for compensating for variations in the voltage of the electric energizing source employed to energize the potentiometer.

The foregoing objects are obtained in accordance with the present invention by an arrangement wherein a resistance bridge is energized from an alternating current source through a suitable rectifier and is connected in circuit with a thermocouple to comprise a system of the potentiometer type. The resistance bridge includes suitable temperature responsive means in certain of its arms whereby the bridge is unbalanced upon variation in the ambient temperature to which the temperature responsive resistances are subjected. The cold junctions of the thermocouple and the temperature responsive resistances of the bridge are subjected to the same ambient temperature variations, and as a result, the unbalance produced in the bridge upon variation in ambient temperature is a function of the change in thermocouple electromotive force produced upon the variations in ambient temperature. By suitably choosing the resistance elements of the bridge the unbalance produced in the bridge upon variation in ambient temperature may be related to the change in thermocouple electromotive force produced upon variation in ambient temperature as is required to exactly compensate for changes in ambient temperature variations.

In accordance with the present invention the bridge network may also be used to provide compensation for variations in the known electromotive force which is opposed to the thermocouple electromotive force in the potentiometer circuit. This advantageous result may be produced when the known electromotive force is derived from the same source of electrical current which is utilized to energize the compensating bridge circuit. When the resistance elements of the bridge circuit are properly chosen in relation to each other, the current flows through certain of the bridge arms may bear a straight line relationship to the voltage drop across those bridge arms while no such straight line relationship obtains for certain other of the bridge arms. Consequently, as the energizing current flows to the bridge changes, the voltage drop across certain of the bridge arms changes to a different extent than the voltage drop across other of the bridge arms to thereby effect a change in the state of balance of the bridge. This change in the unbalance of the bridge may be utilized, as will be recognized by those skilled in the art, to compensate for the variations in the known electromotive force caused by such changes in the voltage of the energizing current source. Such compensation may be effected to a relatively high degree of accuracy by properly proportioning and designing the elements of the bridge network.

The various features of novelty which characterize the present invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Figures 1, 2, 3:
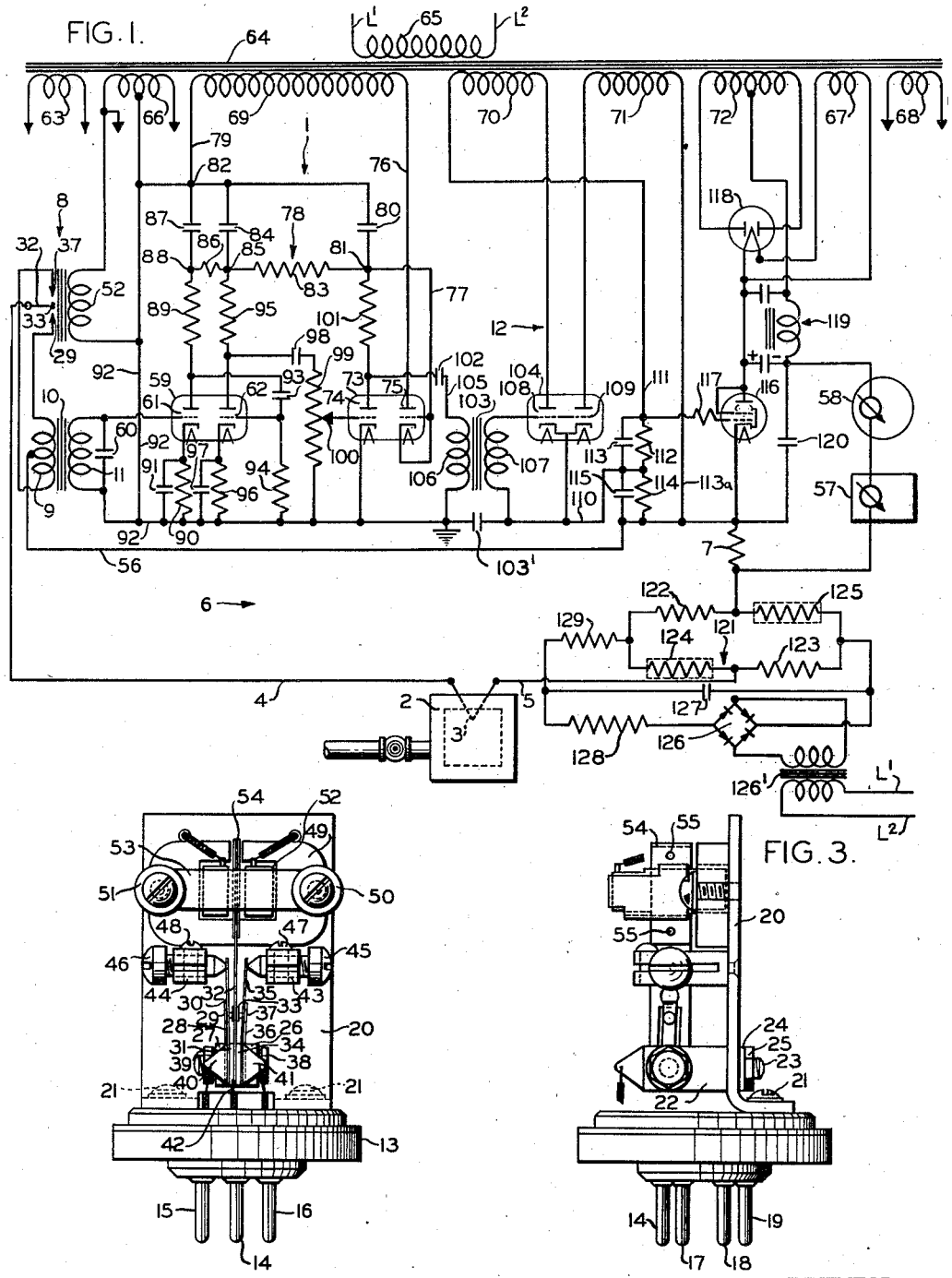
Fig. 1 is a diagrammatic representation of one embodiment of the invention.
Figs. 2 and 3 illustrate in detail one form of converter which may be utilized in the arrangement of Fig. 1.

Referring now to Fig. 1 of the drawing there is illustrated in schematic form an arrangement including an electronic amplifier 1, shown in detail, for producing effects in accordance with the extent of unbalance of a potentiometer network which controls the electronic amplifier 1 and is unbalanced in accordance with the variations in a quantity to be measured, and in which because of the small magnitude of the unbalanced potentiometer electromotive forces, it is not practicable, nor desirable, to have the effects produced directly by the potentiometric network.

More specifically, an arrangement is illustrated in Fig. 1 for indicating and recording the temperature within a furnace 2 in the interior of which a thermocouple 3 is arranged so as to be responsive to slight changes in temperature therein. The thermocouple 3, which may be located at a distance from the remainder of the measuring apparatus, is connected by a pair of conductors 4 and 5 into a potentiometric measuring circuit indicated generally by the reference numeral 6. The potentiometric network also has connected therein a fixed resistance 7, an interrupter or converter device 8, and the primary winding 9 of a transformer 10 having a secondary winding 11. The interrupter or converting device 8 is described in detail in connection with Figs. 2 and 3.

In the arrangement of Fig. 1 the electromotive force developed by the thermocouple 3 is opposed to the potential drop produced across the fixed resistance 7 by a flow of direct current therethrough. The electric current flow through the resistance 7 is derived from the output circuit of the amplifier 1 by means of a reconverter 12 which operates to transform the alternating current output of the amplifier 1 into a corresponding direct current. The output circuit of the amplifier 1 is controlled in accordance with the state of balance between the opposed electromotive forces in the potentiometric network 6, and therefore, the current flow through the resistance 7 is also controlled in accordance with the state of balance of those electromotive forces.

The interrupter 8, illustrated schematically in Fig. 1 and in greater detail in Figs. 2 and 3, operates to convert the potentiometric unbalance direct currents into pulsating currents which are capable of being readily amplified. It will be understood that any suitable current interrupter may be employed for this purpose, but in order to illustrate an operative embodiment, the interrupter shown in detail in Figs. 2 and 3 may be utilized.

The interrupter 8 illustrated in Figs. 2 and 3 is of the type shown and illustrated in application Serial Number 421,176 and filed by Frederick W. Side on December 1, 1941. The interrupter 8 is provided with a base 13 in which are mounted terminals 14, 15, 16, 17, 18 and 19. A plate 20 is screwed to the base 13 by means of screws 21. A stud 22 provided with a screw threaded extension 23 is secured to the lower end of the plate 20 by means of a lock washer 24 and a nut 25. The free end of the stud 23 is bifurcated having spaced apart ends 26 and 27. Located between the spaced ends 26 and 27 are an insulating pad (not shown), a spring contact arm 28 carrying a contact 29, a resilient stop 30, an insulating pad 31, a vibrating reed 32 carrying a contact 33, an insulating pad 34, a resilient stop 35, a spring contact arm 36 carrying a contact 37, and an insulating pad (not shown). These elements are all clamped between the spaced apart ends 26 and 27 by a bolt 38 and a nut 39. The spring contact arms 28 and 36 are provided with ears 40 and 41 respectively, which are electrically connected to the terminals 15 and 16 respectively. The vibrating reed 32 is provided with an ear 42 which is electrically connected to the terminal 14. Riveted to the supporting plate 20 are also studs 43 and 44 which carry adjustable stops in the form of screws 45 and 46 formed of insulating material. When the adjustable stops 45 and 46 have been adjusted as desired they are clamped in place by means of screws 47 and 48 respectively. The spring contact arm 36 carrying the contact 37 through its own resiliency engages the resilient stop 35 and the resilient stop 35 through its own resiliency engages the adjustable stop 45. In like manner the spring contact arm 28 engages the resilient stop 30 which in turn engages the adjustable stop 36. By adjusting the adjustable stops 45 and 46 the positions of the contacts 37 and 29 may be independently adjusted with respect to the contact 33 carried by the vibrating reed 32.

A permanent magnet 49 is secured to the supporting plate 20 by screws 50 and 51. A coil 52 is held in place by a bracket 53 which in turn is secured in place by the screws 50 and 51. The end of the vibrating reed 32 is disposed within the coil 52 and is provided with an armature 54 which is riveted to the vibrating reed 32 by rivets 55 as seen in Fig. 3.

The coil 52 is energized with alternating current and acts on the armature 54 to vibrate the reed 32 at 60 cycles per second, when the alternating current supplied by the alternating current supply mains $L^1$ and $L^2$ is 60 cycle alternating current, to cause the contact 33 to engage and disengage with contacts 37 and 29 at the same frequency. The permanent magnet 49 operates in conjunction with the coil 52 and the armature 54 in such a manner as to cause the armature 54 to vibrate in synchronism with the alternating current supplied by the mains $L^1$ and $L^2$. By adjusting the adjustable stops 45 and 46 and hence the contacts 37 and 29 the wave form produced by the contacts 29, 33 and 37 may be adjusted to the desired value and shape. The contacts 29 and 37 are preferably so arranged that when the contact 33 is in its stationary position it engages both contacts 37 and 29. This provides an overlapping action which compensates for wear of the contacts and also contributes to the elimination of stray electrical effects on the operation of the apparatus. Due to this overlapping action also wear of the contacts does not materially alter the wave form produced by the contacts. By mounting the contacts 29 and 37 on the spring contact arms 28 and 36, respectively good wiping contact is at all times provided by the contact 33 and the contacts 29 and 37. An electrical connection may desirably be provided between one of the screws 21 and ground so that the various parts of the interrupter may be connected to ground to maintain the interrupter at ground potential. A cover (not shown) may also desirably be provided for enclosing the movable parts of the interrupter. Such a cover may be held in place on the base 13 by means of a rolled flange clamping the cover to the base. Such a cover will act to prevent dirt and corrosive atmosphere from affecting the parts of the interrupter.

The interrupter 8 is essentially a polarizing switching mechanism, the operating winding 52 and the permanent magnet 49 cooperating to vibrate the reed 32 at 60 cycles per second in synchronism with the 60 cycle alternating current supply. For purposes of explanation it may be assumed that the contact 37 is engaged by the contact 33 during the first half cycle of the alternating current supply when the voltage is positive and the second contact 29 is engaged by the contact 33 during the second half cycle when the alternating voltage supply is negative. Accordingly, the contacts 33 and 37 engage when the voltage of the alternating current supply is positive and the contacts 33 and 29 engage when the voltage of the alternating current supply is negative. When the vibrating reed 32 is stationary in its mid position both contacts 29 and 37 will be engaged by the contact 33 so that when the vibrating reed is operated the contact 33 is always in engagement with one or the other of the contacts 29 and 37.

The manner of connection of the interrupter 8 to the primary winding 9 of the transformer 10 is schematically shown in Fig. 1. By reference to Fig. 1 it will be noted that the contact 29 is connected to one end terminal of the transformer primary winding 9 and the contact 37 is connected to the other end terminal of the primary winding 9. The contact 33 is connected through the vibrating reed 32 and the terminal 14 to the conductor 4 and thereby to one terminal of the potentiometric circuit 6, and the center tap on the transformer primary winding 9 is connected by a conductor 56 to the other terminal of the poteniometric circuit.

When the potentiometric network 6 is balanced, no current flows in the potentiometric network, and accordingly, operation of the interrupter 8 is ineffective. When the electromotive force developed by the thermocouple 3 increases to unbalance the potentiometric network in one direction, however, the unbalanced potentiometric current flows in the direction from the transformer primary winding 9 to the interrupter 8, and conversely, when the electromotive force developed by the thermocouple 3 decreases to unbalance the potentiometric network 6 in the opposite direction, the potentiometric unbalanced currents flow in the direction from the interrupter 8 to the transformer primary winding 9.

More specifically, upon unbalance of the potentiometric network in one direction to render the conductor 56 positive with respect to the conductor 4, unbalanced current during the first half cycle of the alternating current supplied by the mains $L^1$ and $L^2$ will flow from the conductor 56 to the midpoint of the primary winding 9 through the lower half of the winding 9 to the contact 37, to the contact 33, and the reed 32 to the conductor 4. During the second half cycle of the alternating current supply current will flow from the conductor 56 to the midpoint of the transformer primary winding 9 through the upper half of the winding 9 to contact 29, to contact 33 and through the vibrating reed 32 to the conductor 4. The pulsating direct current flows through the transformer primary winding 9 first through the lower half of the winding and then through the upper half of the winding acts through the core structure of the transformer 10 to induce an alternating voltage in the secondary winding 11 having a predetermined phase relatively to the phase of the alternating current supplied by the mains $L^1$ and $L^2$.

Upon unbalance of the potentiometric network in the opposite direction, the conductor 4 will be rendered positive relatively to the conductor 56, and therefore, the current flows through the transformer primary winding 9 will alternately be from the lower end of the winding to the midpoint when the contacts 33 and 37 are in engagement, and from the upper end of the winding to the midpoint when the contacts 29 and 33 are in engagement. These pulsating direct currents through the transformer primary winding 9 are in the opposite direction from what they were when the potentiometric network was unbalanced in the opposite direction, and as a result, these pulsating direct current flows operate through the core structure of the transformer 10 to induce a voltage in the transformer secondary winding 11 which is of the opposite phase relatively to the voltage of the alternating current supply mains $L^1$ and $L^2$.

Accordingly, when the potentiometric network 6 is unbalanced in one direction, an alternating voltage of one phase relative to the voltage of the supply mains $L^1$ and $L^2$ is induced in the transformer secondary winding 11, and when the potentiometric network is unbalanced in the opposite direction an alternating voltage of the opposite phase relative to the voltage of the supply mains $L^1$ and $L^2$ is induced in the transformer secondary winding 11. When the network is precisely balanced there is no current flow through the primary winding 9 of the transformer 11, and hence, the alternating voltage derived in the transformer secondary winding 11 is zero.

When the electromotive force developed by the thermocouple is exactly that value which is maintained across resistance 7 by the flow of current therethrough from the output circuit of the reconverter 12, the differential between the opposed potentials will be zero, and therefore, the alternating current induced in the transformer winding 11 and impressed on the input circuit of the amplifier 11 will also be zero. Under this condition the direct current output from the reconverter 12 will be that value needed to produce a potential drop across resistance 7 of the required magnitude to balance the thermocouple electromotive force. In this condition of operation of the measuring apparatus the potentiometric network 6 is precisely balanced.

Upon a change in the electromotive force developed by the thermocouple 3 the state of precise balance of the potentiometric network 6 will be disturbed and a difference in potential between the two opposed potentials will be produced. This difference in potential is translated by the interrupter 8 and the transformer 10 into an alternating current of one phase or of opposite phase depending upon the polarity of that difference in potential and thereby upon the direction of the change in the thermocouple electromotive force. This alternating current is amplified by the electronic amplifier 1 and operates to vary the direct current output from the reconverter 12 as is required to reduce the difference in potential between the opposed electromotive forces in the potentiometric network. That is to say, the changes in the output current from the reconverter 12 operates to produce a corresponding change in potential drop across resistance 7 which is in the proper direction to tend to restore the state of balance of the potentiometric network 6. The change in output current from reconverter 12 required to restore the network 6 to its balance condition depends upon the extent to which the electromotive force of thermocouple 3 has changed.

As will be recognized by those skilled in the art, the potentiometric network 6 will not be returned to its exact condition of balance since some slight unbalance of the potentiometric network 6 is required to maintain the new value of output current from the reconverter 12. The degree of unbalance of the potentiometric network required to maintain this new reconverter output current is insignificant, however, and therefore, for all practical purposes the potentiometric network 6 is rebalanced.

A milliammeter recorder 57 and a milliammeter indicator 58 are connected in series with the resistance 7 in the output circuit of the reconverter 12 and are provided to measure the current flowing through the resistance 7 from the reconverter 12. It will be recognized that the current flow through the resistance 7 required to balance or stabilize the electromotive force developed by the thermocouple 3 will provide a measure of the temperature to which the thermocouple is subjected. Thus, the milliammeter instruments provide a record or indication of the temperature within the interior of the furnace to which the thermocouple is subjected.

The electronic device 1 includes an electronic tube 59 to the input circuit of which the alternating voltage induced in the transformer secondary winding 11 is applied. The transformer secondary winding 11 may be shunted by a condenser 60 of suitable value for tuning the winding 11 to obtain the most efficient and satisfactory operation. The electronic tube 59 includes two heater type triodes, which have been designated by the reference numerals 61 and 62, within the same envelope. The triode 61 includes anode, control electrode, cathode and heater filament elements, and the triode 62 includes like elements. The filaments of the triodes 61 and 62 may be connected in parallel and are arranged to receive energizing current from the low voltage secondary winding 63 of a transformer 64 having a line voltage primary winding 65, low voltage secondary windings 66, 67 and 68, and high voltage secondary windings 69, 70 and 71 and 72. The conductors to the heater filaments of the electronic tube 59 have not been shown in order to avoid complication of the drawing. The primary winding 65 of the transformer 64 is connected to and receives energizing current from the alternating current supply mains L¹ and L².

As illustrated, a portion of the transformer secondary winding 66 is connected to and supplies energizing current to the operating coil 52 of the interrupter 8.

The transformer secondary winding 66 is also connected by means of conductors (not shown) to the heater filaments of an electronic valve 73. The electronic valve 73 includes two heater type triodes, designated by the reference characters 74 and 75, within the same envelope. Both of the triodes of valve 73 include anode, control electrode, cathode, and heater filament elements.

The triode 75 of the electronic tube 73 is utilized as a half-wave rectifier to supply a source of direct current voltage for supplying the output circuits of the triodes 61 and 62 and 74. The control electrode and cathode of triode 75 are connected to each other and the output circuit thereof is energized by the transformer secondary winding 69 through a circuit which may be traced from the right end terminal of the winding 69, as seen in the drawing, through a conductor 76 to the anode of the triode 75, the cathode thereof, and through a conductor 77 to the positive terminal of a filter which is designated by the reference numeral 78. The negative terminal of the filter 78 is connected by a conductor 79 to the left end terminal of the transformer secondary winding 69.

The filter 78 includes a condenser 80 which operates to smooth out the ripple in the output voltage of the filter between the points 81 and 82. The filter 78 also includes a resistance 83 and a condenser 84 which operates to smooth out the output voltage of the filter between the filter points 85 and 82. The filter 78 further includes a resistance 86 and a condenser 87 for smoothing out the output voltage between the filter points 88 and 82. The filter, therefore, comprises 3 stages. A three stage filter is provided because for the most efficient and satisfactory operation, it is necessary that the anode voltage supply to the triode 59 be substantially free from ripple whereas it is not necessary to supply anode voltage so free from ripple to triode 62. In addition, it is not necessary to supply anode voltage as free from ripple to the triode 74 as it is to the triode 62.

The anode circuit of the triode 61 may be traced from the filter point 88 which comprises the positive terminal of the filter through a fixed resistance 89 to the anode of the triode 61, to the cathode thereof and through a cathode biasing resistance 90 which is shunted by a condenser 91, to the negative filter point 82 through a conductor 92. The cathode biasing resistance 90 and the parallel connected condenser 91 are utilized for biasing the control electrode of the triode 61 negatively with respect to the cathode.

The input circuit of the triode 61 may be traced from the cathode to the parallel connected resistance 90 and condenser 91 through the transformer secondary winding 11 to the control electrode of the triode 61.

The output circuit of the triode 61 is coupled by means of a condenser 93 and a resistance 94 to the input circuit of the triode 62. More particularly, the anode of the triode 61 is connected by condenser 93 to the control electrode of the triode 62 and the control electrode of the triode 62 is connected through the resistance 94 to the conductor 92 and therethrough to the cathode of the triode 62.

The anode circuit of the triode 62 may be traced from the positive terminal 85 of the filter 78 through a fixed resistance 95 to the anode of the triode 62, the cathode thereof, a biasing resistance 96 which is shunted by a condenser 97, and conductor 92 to the negative terminal 82 of the filter. The output circuit of the triode 62 is resistance capacity coupled by means of a condenser 98 and a resistance 99 to the input circuit of the triode 74. As illustrated, a contact 100 which is in engagement with the resistance 99 is provided for varying the point of contact of the control electrode of the triode 74 to the resistance 99. The resistance 99 and contact 100 perform a dual function, namely, to limit the extent to which the triode 74 may be driven positive relatively to its associated cathode and also to vary the signal impressed upon the control electrode from the output circuit of the triode 62. It is noted the resistances 94 and 99 which are connected in the input circuit of the triodes 62 and 74, respectively operate to maintain the control electrodes of the triodes 62 and 74 at ground potential when no voltage is induced in the transformer secondary winding 11, as is also the control electrode of triode 61. Upon the induction of an alternating voltage in the secondary winding 11, resistances 94 and 99 permit the flow of current between the control electrodes of the triodes 62 and 74 and their associated cathodes to thereby limit the extent to which the control electrodes of the triodes 62 and 74 are permitted to go positive with respect to their associated cathodes.

Anode voltage is supplied the output circuit of the triode 74 from the filter 78 through a circuit which may be traced from the filter point 81 through a fixed resistance 101, the anode of the triode 74, the anode to cathode resistance, and conductor 92 to the negative filter point 82.

The output circuit of the triode 74 is coupled by means of a condenser 102 and a transformer 103 to the input circuit of an electronic valve 104. To this end, the anode of the triode 74 is connected by a conductor 105, in which a condenser 102 and the primary winding 106 of transformer 103 are connected in series, to the cathode of triode 74. Thus the condenser 102 and the primary winding 106 of the transformer 103 are connected in shunt to the anode to cathode resistance of triode 74. The secondary winding 107 of the transformer 103 has its terminals connected to the input circuit tube 104.

The electronic tube 104 includes two heater type triodes which have been designated by the reference numerals 108 and 109 within the same envelope. Both of the triodes includes anode, control electrode, cathode, and heater filament elements. The heater filaments of the triodes 108 and 109 may desirably be connected in parallel with each other and receive energizing current through conductors (not shown) from the transformer secondary winding 68.

The input circuits of the triodes 108 and 109 are connected in parallel to the transformer secondary winding 107. Specifically, one terminal of the transformer secondary winding 107 is connected to both of the control electrodes of the triodes 108 and 109, and the other terminal of the transformer secondary winding 107 is connected to the cathodes of the triodes 108 and 109.

Anode voltage is supplied to the output circuits of the triodes 108 and 109 from the high voltage secondary windings 70 and 71. Thus, the anode of the triode 108 is connected to the right end terminal of the transformer secondary winding 70 and the anode of the triode 109 is connected to the left end terminal of the transformer secondary winding 71. The anode circuit of the triode 108 may be traced from the right end terminal of the winding 70 to the anode of triode 108, the cathode thereof, a conductor 110, and a conductor 111, in which a resistance 112 shunted by a condenser 113 is inserted, to the left end terminal of the winding 70. The anode circuit of triode 109 may be traced from the left end of the winding 71 to the anode of triode 109, to the cathode thereof, conductor 110, and a conductor 113a in which a resistance 114 shunted by a condenser 115 is inserted, to the right end terminal of the winding 71. The transformer secondary windings 70 and 71 are so wound on the transformer 64 that the triodes 108 and 109 are adapted to be rendered alternately conductive, that is, one triode will be conductive while the other is non-conductive and vice versa.

When the signal impressed on the input circuits of triodes 108 and 109 by the transformer secondary winding 107 is zero, the triodes 108 and 109 will be equally conductive during alternate half cycles, and consequently, the average current flow through the resistance 112 will be the same as that through the resistance 114. The current flows through the resistances 112 and 114 will be in opposite directions, however, and therefore, the potential drop across resistance 112 will be opposed to that across resistance 114. When resistances 114 and 112 are equal in magnitude the potential drop so produced across these resistances will then be equal in magnitude.

The resistances 112 and 114 are connected in the input circuit of an electronic valve 116 and the resultant potential drop across these resistances is utilized for the purpose of controlling the conductivity of valve 116. The valve 116 may be of the type known commonly as beam power amplifier valves, and includes an anode, a control electrode, a screen electrode, a beam forming plate, a cathode, and a heater filament. The heater filament may desirably be connected in parallel with the heater filaments of triodes 108 and 109 to the terminals of the transformer secondary winding 68 for receiving energizing current from the latter. The input circuit of the valve 116 may be traced from its cathode through the resistances 114 and 112 and through a current limiting resistance 117 to the control electrode of valve 116.

Anode voltage is supplied to the electronic valve 116 from the full wave rectifier arrangement including an electronic valve 118 and a filter 119. Valve 118 includes a filament type cathode and a pair of anodes. The filament cathode is connected to and receives energizing current from the transformer secondary winding 67. One anode of the valve 118 is connected to one terminal of the transformer secondary winding 72 and the other anode of the valve 118 is connected to the other terminal of the winding 72. The rectified current from the valve 118 is connected to the input terminals of filter 119, which may be of any suitable type, through a circuit which may be traced from the filament of valve 118 to one input terminal of filter 119 and from the other input terminal of the filter to the center tap of transformer secondary winding 72. The filter 119 includes suitable capacative and inductive elements and has its positive output terminal directly connected to the anode of the valve 116. The output circuit of the valve 116 may be traced from the positive output terminal of the filter 119 to the anode of valve 116, the cathode thereof, the fixed resistance 7, the milliammeter recorder 57 and the milliammeter indicator 58 to the negative output terminal of the filter 119.

When the potential drop across the resistance 114 is equal to that across the resistance 112, the potential of the control electrode of valve 116 will be the same as the potential of the cathode thereof and under this condition the current flow in the output circuit of valve 116 will be a predetermined value. The fixed resistance 7 may be so chosen that with this current flow therethrough the potential drop across it will be precisely that value required to balance out the electromotive forces produced by the thermocouple 3. The potentiometric network 6 will then be precisely balanced. This equality in potential across resistances 112 and 114 is obtained when the triodes 108 and 109 are equally conductive or in other words, when the signal impressed on the input circuits of the triodes 108 and 109 from the transformer secondary winding 107 is zero.

Upon a change in the electromotive force produced by the thermocouple 3 from the value of precise potentiometric balance, for example, upon an increase in thermocouple electromotive force, the potentiometric network 6 will become unbalanced and the unbalanced potentials in the potentiometric network will be translated by the interrupter 8 and the transformer 10 into an alternating voltage which is of the proper phase to drive the control electrode of triode 109 positive during the half cycle of the alternating voltage supply when the anode of the triode 109 is also positive and to drive the control electrode of triode 108 negative when the anode of triode 108 is positive. The current in the output circuit of the triode 109 is then rendered greater than the current in the output circuit of the triode 108, and consequently, the potential drop across resistance 114 then predominates over the potential drop across resistance 112. Since the potential drop across resistance 114 is in the direction tending to drive the control electrode of valve 116 positive with respect to the potential of its associated cathode, the current flow in the output circuit of valve 116 will be increased to thereby effect an increase in the potential drop across the resistance 7. This change in potential drop across resistance 7 is in the proper direction to tend to restore the state of balance of the potentiometric network 6. Some slight unbalance of the potentiometric network 6 is required to maintain the increased current in the output circuit of the valve 116, however, and therefore, the potentiometric network 6 will not be precisely balanced, but for all practical purposes will be substantially rebalanced since the degree of unbalance required to maintain the new value of output current from valve 116 is insignificant.

Upon a decrease in the electromotive force developed by the thermocouple 3 from the value of precise potentiometric balance the potentiometric network 6 will be unbalanced in the opposite sense and the unbalanced potentiometric currents will be translated by the interrupter 8 and the transformer 10 into an alternating current of the opposite phase and this alternating current of opposite phase will operate to render the triode 108 more conductive than triode 109. Accordingly, the potential drop across the resistance 112 will be rendered greater than that across resistance 114. This will tend to cause the application of a negative potential to the control electrode of valve 116 and thereby a decrease in the output current flow from the valve 116. This change in current flow from the valve 116, and thereby through the resistance 7, is in the proper direction to effect a reduction in the unbalanced current flows in the potentiometric network 6.

The current flow through the resistance 7 required to balance out the thermocouple electromotive force will be indicated by the meters 57 and 58. When these meters are calibrated in terms of temperature, they will directly provide a measure of the temperature to which the thermocouple is subjected.

A condenser 103' is provided between the lower end of the transformer secondary winding 107 and ground for the purpose of eliminating undesired stray alternating currents which may be extraneously introduced into the potentiometric network 6. By providing condenser 103' such induced stray alternating currents are by-passed to ground and their effect on the operation of the measuring apparatus is thus materially reduced, if not wholly eliminated.

In order to compensate the measuring apparatus described for variations in the ambient temperature to which the cold junctions of the thermocouple 3 may be subjected, means have been provided in the form of a bridge network 121 which has its equalizing or output terminals connected in the potentiometric network in series with the thermocouple 3 and the resistance 7. The bridge network 121 includes resistances 122 and 123 in opposite arms thereof and resistances 124 and 125 in the remaining arms thereof. The resistances 122 and 123 are preferably of the type having a negligible temperature coefficient of resistance, that is the resistance values of these elements remain substantially constant notwithstanding variations in temperature to which these resistances are subjected. On the other hand, resistances 124 and 125 are so chosen as to have an appreciable temperature coefficient of resistance. That is to say, the resistance values of the resistances 124 and 125 vary in correspondence with the variations in ambient temperature to which these resistances are subjected. The resistances 124 and 125 are preferably disposed closely adjacent the cold junctions of the thermocouple 3 so that the cold junctions of the thermocouple and the resistances 124 and 125 will be maintained at the same ambient temperature.

Energizing current is supplied the bridge network 121 from the supply lines $L^1$ and $L^2$ through a suitable transformer 126' and a full wave rectifier 126 which may be of the copper oxide type. Resistances 128 and 129 may desirably be connected in the energizing circuit to the bridge network 121 from the output terminals of the rectifier 126. A condenser 127 is provided across the output terminals of the rectifier 126 for smoothing out the ripple in the rectifier output voltage and may be connected, as shown, between one energizing terminal of bridge 121 and a point intermediate resistances 128 and 129.

The resistance values for the resistances 122 and 123, 124 and 125 of the bridge network 121 are so chosen that when the ambient temperature to which the cold junctions of the thermocouple 3 and the resistances 124 and 125 are subjected is a predetermined value the equalizing or balancing terminals of the bridge network 121 will be at the same potential. It is noted that this condition is intended to prevail only when the voltage supplied by the supply lines $L^1$ and $L^2$ is a predetermined value, as is explained more in detail hereinafter.

Upon a change in the ambient temperature, for example upon an increase in ambient temperature, the electromotive force produced by the thermocouple 3 will be decreased because the temperature difference between the thermocouple hot and cold junctions will then decrease. If this decrease in thermocouple electromotive force were not corrected for, an error in the temperature measurement obtained would result. The resistances 124 and 125 of the bridge network 121 are subjected to the same ambient temperature as the thermocouple cold junctions, however, and the resistance elements of the bridge are so arranged that this ambient temperature variation causes an electromotive force to appear between the equalizing or balancing terminals of the network 121. This electromotive force is of the proper polarity to oppose the change in thermocouple electromotive force developed by the thermocouple 3, and when the bridge network is properly designed will be the precise value to exactly compensate for the change in thermocouple electromotive force produced by the ambient temperature change.

On the other hand, upon a decrease in the ambient temperature, the electromotive force produced by the thermocouple 3 will be correspondingly increased. In this case an electromotive force will appear between the equalizing or balancing terminals of the bridge network 121 which is of the proper polarity to again oppose the change in thermocouple electromotive force and will be of the precise value to exactly compensate for the change in thermocouple electromotive force.

The arrangement described including the bridge network 121 also operates to effect another advantageous function, namely, compensation for the effect of variations in the voltage of the supply lines L¹ and L² upon the operation of the measuring apparatus. Variations in the voltage provided by supply conductors L¹ and L² operate to effect corresponding variations in the potential drop across resistance 7 as will be readily recognized by those skilled in the art. Such variations in potential drop across resistance 7, if not compensated for, would produce undesired errors in measurement obtained.

In accordance with the present invention, such variations in the potential drop across resistance 7 are compensated for by means of the bridge network 121 as a consequence of the action of the resistances 124 and 125 changing in value with variation in the current flow therethrough. That is to say, upon a change in the voltage of the supply lines L¹ and L², the current supplied to the energizing terminals of the bridge network 121 will be changed to a corresponding extent. This change in current flow through the resistances 124 and 125 operates to change the operating temperature of these resistances and thereby operate to effect a change in the resistances thereof. The resistances 124 and 125 are preferably of the type in which the relationship between current flow and temperature is not a straight line relationship, that is, the voltage drops through the resistances 122 and 123 bear a straight line relationship to the current flow therethrough, but no such straight line relation obtains for the resistances 124 and 125. As the current flow through the latter resistances is increased the temperature of the latter is increased and because of the temperature coefficient of resistance exhibited by these resistances the voltage drop across these resistances also increases. The resistances 124 and 125, for example, may be composed of nickel.

Thus, upon change in the voltage of the alternating current supply lines L¹ and L² resulting in a corresponding change in the potential across resistance 7, an unbalanced potential will appear between the equalizing or balancing terminals of the bridge network of the proper polarity and magnitude to exactly compensate for the variation in potential across resistance 7 produced by such line voltage variation.

Such compensation for variations in the ambient temperature to which the cold junctions of the thermocouple 3 are subjected and such compensation for variations in line voltage of the alternating current supply lines may be obtained by the same bridge network 121 by properly choosing the values and characteristics of the resistance elements 122, 123, 124 and 125.

It will be understood that, if desired, the resistances 122 and 123 of bridge 121 may be composed of material having an appreciable temperature coefficient of resistance and may be disposed closely adjacent the cold junctions of the thermocouple 3 to maintain the resistances 122 and 123 at the same ambient temperature as the cold junctions also. By providing resistances 122 and 123 having a negative temperature coefficient of resistance when the resistances 124 and 125 are nickel and exhibit a positive temperature coefficient of resistance the difference in unbalance in the bridge 121 per degree change in temperature is much greater than if such negative coefficient resistances are not provided, and the compensation for variations in the ambient temperature may be accomplished with the bridge operating on a smaller current flow from the rectifier 126. To this end the resistances 122 and 123 may be composed of material such as carborundum, and by way of example may be resistances of the type known and sold commercially under the trade name Thermistors by the Western Electric Company.

When the gain of the electronic amplifier 1 approaches infinity compensation for the undesired effects of variations in the voltage of the supply lines L¹ and L² is not required because of the inherent stability of the measuring apparatus under this circumstance. It may be necessary to provide additional stages of amplification in the amplifier 1 to obtain a gain which approaches infinity. With such a high gain amplifier 1 only a very small unbalanced electromotive force is required in the potentiometric network to vary the conductivity of the electronic valve 116 throughout its entire range of variation. Consequently, upon a change in the potential drop across resistance 7 due to change in the voltage of the supply lines L¹ and L² the resulting unbalanced electromotive force produced in the potentiometric network operates to produce a corrective adjustment of the conductivity of valve 116 to restore the current flow through resistance 7 and thereby the potential drop thereacross substantially to its original value. Only a very minute unbalanced potential in the potentiometric network 6 is required to maintain the electronic valve 116 at its new state of conductivity, and therefore, for all practical purposes the current flow through the resistance 7 and through the meters 57 and 58 is restored to the existing value prior to the line voltage variation.

When an electronic amplifier 1 the gain of which approaches infinity is employed, the transformer 126' which is provided for energizing the rectifier 126 from the supply lines L and L may be a constant voltage transformer for example of the type manufactured and sold commercially by the Sola Electric Company and disclosed in U. S. Patent 2,143,745 which was issued on January 10, 1939, to Joseph C. Sola or of the type disclosed in application Serial Number 349,625 filed on August 2, 1940, by Earl A. Keeler. The use of a constant voltage transformer in lieu of the transformer 126' results in the maintenance of a constant energizing voltage on the rectifier 126 irrespective of variations in the voltage of the alternating current supply conductors $L^1$ and $L^2$ over a wide range and thereby in the maintenance of a constant direct current voltage on the bridge circuit 121. Accordingly, the compensation for variations in the cold junction temperature of the thermocouple 3 which is produced by the bridge network 121 will be effective to a high degree of accuracy and will be independent of variations in the voltage of the supply lines $L^1$ and $L^2$.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Measuring apparatus including a first unidirectional E. M. F. which is variable in magnitude and which varies in magnitude in accordance with the variations in magnitude of a variable condition, a second unidirectional E. M. F. to be measured and which varies in magnitude in accordance with the variations in a plurality of variable conditions, a circuit connection to oppose said first and second unidirectional E. M. F.'s to derive a differential E. M. F., means responsive to said differential E. M. F. to vary the magnitude of said first unidirectional E. M. F. to reduce said differential E. M. F., and means in said circuit connection to compensate for variations in said first unidirectional E. M. F. due to variations in said first mentioned variable condition and to compensate for variations in said second unidirectional E. M. F. due to variations in at least one of said variable conditions.

2. Measuring apparatus including a source of energizing voltage, means to derive from said source a first unidirectional E. M. F. of magnitude which varies in accordance with the variations in magnitude of said energizing voltage, a second unidirectional E. M. F. which varies in magnitude in accordance with the variations in a plurality of variable conditions, a circuit connection to oppose said first and second unidirectional E. M. F.'s to derive a differential E. M. F., means responsive to said differential E. M. F. to control said first mentioned means to vary said first unidirectional E. M. F. to reduce said differential E. M. F., and means in said circuit connection to compensate for variations in said first unidirectional E. M. F. due to the variations in voltage of said energizing source and to compensate for variations in said second unidirectional E. M. F. due to variations in at least one of said variable conditions.

3. Measuring apparatus including a first unidirectional E. M. F. which is variable in magnitude and which varies in magnitude in accordance with the variations in magnitude of a variable condition, a thermocouple subjected to a variable temperature condition to be measured and producing a unidirectional E. M. F. varying in accordance with the variations in said temperature condition, a circuit connection to oppose said first and second unidirectional E. M. F.'s to derive a differential E. M. F., means responsive to said differential unidirectional E. M. F. to reduce said differential E. M. F., and means in said circuit connection responsive to the variations in said first mentioned variable condition to compensate for variations in said first unidirectional E. M. F. produced thereby and responsive to variations in the temperature of the cold junctions of said thermocouple to compensate for variations in the second unidirectional E. M. F. produced by variations in the thermocouple cold junction temperature.

4. Measuring apparatus including a source of energizing voltage, means to derive from said source a first unidirectional E. M. F. of magnitude which varies in accordance with the variations in magnitude of said energizing voltage, a second unidirectional E. M. F. which varies in magnitude in accordance with the variations in a plurality of variable conditions, a circuit connection to oppose said first and second unidirectional E. M. F.'s to derive a differential E. M. F., means responsive to said differential E. M. F. to control said first mentioned means to vary said differential E. M. F., and a bridge circuit connected in said circuit connection to introduce a compensating unidirectional E. M. F. therein, said bridge circuit being energized by said energizing voltage and including means which is responsive to variations in said energizing voltage to compensate for variations in said first unidirectional E. M. F. due to variations in said energizing voltage and is responsive to variations in at least one of said variable conditions to compensate for variations in said second unidirectional E. M. F. due to variations in said one variable condition.

5. The combination of claim 4 wherein said source of energizing voltage is a source of alternating voltage and said first mentioned means includes rectifying means.

6. The combination of claim 4 wherein said source of energizing voltage is a source of alternating voltage, said first mentioned means includes electronic valve rectifying means, said second mentioned means includes means to translate said differential E. M. F. into an alternating E. M. F., means to amplify said alternating E. M. F. and to apply said amplified quantity to control said electronic valve rectifying means, wherein rectifying means are interposed between said bridge circuit and said energizing voltage whereby said bridge circuit is energized with unidirectional current, and wherein the responsive means of said bridge circuit include a resistance element having a temperature coefficient of resistance.

7. Measuring apparatus including a source of energizing voltage, means to derive from said source a first unidirectional E. M. F of magnitude which varies in accordance with the variations in magnitude of said energizing voltage, a thermocouple subjected to a variable temperature condition to be measured and producing a unidirectional E. M. F. varying in accordance with the variations in said temperature condition, a circuit connection to oppose said first and second unidirectional E. M. F.'s to derive a differential E. M. F., means responsive to said differential E. M. F. to vary the magnitude of said first unidirectional E. M. F. to reduce said differential E. M. F., and a bridge circuit connected in said circuit connection to introduce a compensating unidirectional E. M. F. therein, said bridge circuit being energized by said energizing voltage and including means which is responsive to variations in said energizing voltage to compensate for variations in said first unidirectional E. M. F. due to variations in said energizing voltage and is responsive to variations in the cold junction temperature of said thermocouple to compensate for variations in said second unidirectional E. M. F. due to variations in the thermocouple cold junction temperature.

8. The combination of claim 7 wherein said source of energizing voltage is a source of alternating voltage, said first mentioned means includes electronic valve rectifying means, said second mentioned means includes means to translate said differential E. M. F. into an alternating E. M. F., electronic amplifying means to amplify said alternating E. M. F. and to apply said amplified quantity to control said electronic valve rectifying means, wherein rectifying means are interposed between said bridge circuit and said energizing voltage whereby said bridge circuit is energized with unidirectional current, and wherein the responsive means of said bridge circuit include a resistance element having a temperature coefficient of resistance.

9. Measuring apparatus including a first unidirectional E. M. F. which is variable in magnitude and which varies in magnitude in accordance with the variations in magnitude of a variable condition, a second unidirectional E. M. F. to be measured, a circuit connection to oppose said first and second unidirectional E. M. F.'s to derive a differential E. M. F., means responsive to said differential E. M. F. to vary the magnitude of said first mentioned unidirectional E. M. F. to reduce said differential E. M. F., and means in said circuit connection to compensate for variations in said first unidirectional E. M. F. due to variations in said variable condition.

10. Measuring apparatus including a source of energizing voltage, means to derive from said source a first unidirectional E. M. F. of magnitude which varies in accordance with the variations in magnitude of said energizing voltage, a second unidirectional E. M. F. to be measured, a circuit connection to oppose said first and second unidirectional E. M. F.'s to derive a differential E. M. F., means responsive to said differential E. M. F. to control said first mentioned means to vary said first unidirectional E. M. F. to reduce said differential E. M. F., and means in said circuit connection to compensate for variations in said first unidirectional E. M. F. due to variations in said energizing voltage.

11. Measuring apparatus including a source of energizing voltage, means to derive from said source a first unidirectional E. M. F. of magnitude which varies in accordance with said energizing voltage, a thermocouple subjected to a variable temperature condition to be measured and producing a unidirectional E. M. F. varying in accordance with the variations in said temperature condition, a circuit connection to oppose said first and second unidirectional E. M. F.'s to derive a differential E. M. F., means responsive to said differential E. M. F. to vary the magnitude of said first unidirectional E. M. F. to reduce said differential E. M. F., and a bridge circuit having its equalizing terminals connected in said circuit connection and its energizing terminals connected in circuit with said energizing voltage source to introduce an E. M. F. into said circuit connection to compensate for variations in said first unidirectional E. M. F. due to variations in said energizing voltage.

12. Self balancing apparatus for measuring the magnitude of a unidirectional E. M. F. including a second variable unidirectional E. M. F. which varies in magnitude in accordance with the variations in magnitude of a variable condition, a circuit connection to oppose said E. M. F.'s to derive a differential E. M. F., physically stationary means controlled directly and electrically by said differential E. M. F. to regulate the magnitude of said second mentioned E. M. F. to reduce the magnitude of said differential E. M. F., and means in said circuit connection to compensate for variations in said second mentioned E. M. F. due to variations in said variable condition.

13. Self balancing apparatus for measuring the magnitude of a unidirectional E. M. F. including a second variable unidirectional E. M. F. which varies in magnitude in accordance with the variations in magnitude of a variable condition, a circuit connection to oppose said E. M. F.'s to derive a differential E. M. F., means including intermittently operating circuit interrupting means connected in said circuit connection to convert the differential E. M. F. into a fluctuating E. M. F., physically stationary means controlled by said fluctuating E. M. F. to regulate the magnitude of said second mentioned E. M. F. to reduce the magnitude of said differential E. M. F., and means in said circuit connection to compensate for variations in said second mentioned E. M. F. due to variations in said variable condition.

14. Self balancing apparatus for measuring the magnitude of a unidirectional E. M. F. including a source of energizing voltage, means to derive from said source a second unidirectional E. M. F. of magnitude which varies in accordance with the variations in magnitude of said energizing voltage, a circuit connection to oppose said E. M. F's. to derive a differential E. M. F., physically stationary means controlled directly and electrically by said differential E. M. F. to regulate the magnitude of said second mentioned E. M. F. to reduce the magnitude of said differential E. M. F., and a bridge circuit having its equalizing terminals connected in said circuit connection and its energizing terminals connected in circuit with said energizing voltage source to introduce an E. M. F. in said circuit connection to compensate for variations in said second mentioned E. M. F. due to variations in said energizing voltage.

15. Self balancing apparatus for measuring the magnitude of a unidirectional E. M. F. which E. M. F. varies in magnitude in accordance with the variations in magnitude of a plurality of variable condition, including a unidirectional E. M. F. of known magnitude, a circuit connection to oppose said E. M. F's. to derive a differential E. M. F., physically stationary means controlled directly and electrically by said differential E. M. F. to regulate the magnitude of said known E. M. F. to reduce the magnitude of said differential E. M. F., and means in said circuit connection to compensate for variations in said first mentioned unidirectional E. M. F. due to variations in at least one of said plurality of variable conditions.

16. Self balancing apparatus for measuring the magnitude of a unidirectional E. M. F. which E. M. F. varies in magnitude in accordance with the variations in magnitude of a plurality of variable conditions, including a unidirectional F. M. F. of known magnitude, a circuit connection to oppose said E. M. F's. to derive a differential E. M. F., means including intermittently operating circuit interrupting means connected in said circuit connection to convert the differential E. M. F. into a fluctuating E. M. F., and physically stationary means controlled by said fluctuating potential to regulate the magnitude of said known E. M. F. to reduce the magnitude of said differential E. M. F., and means in said circuit connection to compensate for variations in said first mentioned unidirectional E. M. F. due to variations in at least one of said plurality of variable conditions.

17. Self balancing apparatus for measuring the magnitude of a unidirectional E. M. F. which E. M. F. varies in magnitude in accordance with the variations in magnitude of a plurality of variable conditions, including a unidirectional E. M. F. of known magnitude, a circuit connection to oppose said E. M. F's. to derive a differential E. M. F., physically stationary means controlled directly and electrically by said differential E. M. F. to regulate the magnitude of said known E. M. F. to reduce the magnitude of said differential E. M. F., and a bridge circuit means having its equalizing terminals connected in said circuit connection to compensate for variations in said first mentioned unidirectional E. M. F. due to variations in at least one of said plurality of variable conditions.

18. Self balancing apparatus for measuring the magnitude of a unidirectional E. M. F. produced by a thermocouple subjected to a variable temperature condition to be measured, including a unidirectional E. M. F. of known magnitude, a circuit connection to oppose said E. M. F's. to derive a differential E. M. F., physically stationary means controlled directly and electrically by said differential E. M. F. to regulate the magnitude of said known E. M. F. to reduce the magnitude of said differential E. M. F., and a bridge circuit connected in said circuit connection to introduce a compensating unidirectional E. M. F. therein, said bridge circuit including means which is responsive to variations in the cold junction temperature of said thermocouple to compensate for variations in said thermocouple E. M. F. due to variations in the thermocouple cold junction temperature.

19. Self balancing apparatus for measuring the magnitude of a unidirectional E. M. F. which E. M. F. varies in magnitude in accordance with the variations in magnitude of a plurality of variable conditions, including a source of energizing voltage, means to derive from said source a second unidirectional E. M. F. of magnitude which varies in accordance with the variations in magnitude of said energizing voltage, a circuit connection to oppose said E. M. F's. to derive a differential E. M. F., physically stationary means controlled directly and electrically by said differential E. M. F. to regulate the magnitude of said second mentioned E. M. F. to reduce the magnitude of said differential E. M. F., and a bridge circuit having its equalizing terminals connected in said circuit connection and its energizing terminals connected in circuit with said energizing voltage source to introduce an E. M. F. in said circuit connection to compensate for variations in said first mentioned E. M. F. due to variations in at least one of said plurality of variable conditions and to compensate for variations in said second mentioned E. M. F. due to variations in the magnitude of said energizing voltage.

20. Self balancing apparatus for measuring the magnitude of a unidirectional E. M. F. which E. M. F. varies in magnitude in accordance with the variations in magnitude of a plurality of variable conditions, including a source of energizing voltage, means to derive from said source a second unidirectional E. M. F. of magnitude which varies in accordance with the variations in magnitude of said energizing voltage, a circuit connection to oppose said E. M. F.'s to derive a differential E. M. F., means including intermittently operating circuit interrupting means connected in said circuit connection to convert the differential E. M. F. into a fluctuating E. M. F., and physically stationary means controlled by said fluctuating E. M. F. to regulate the magnitude of said second mentioned E. M. F. to reduce the magnitude of said differential E. M. F., and a bridge circuit having its equalizing terminals connected in said circuit connection and its energizing terminals connected in circuit with said energizing voltage source to introduce an E. M. F. in said circuit connection to compensate for variations in said first mentioned E. M. F. due to variations in at least one of said plurality of variable conditions and to compensate for variations in said second mentioned E. M. F. due to variations in the magnitude of said energizing voltage.

21. Self balancing apparatus for measuring the magnitude of a unidirectional E. M. F. produced by a thermocouple subjected to a variable temperature to be measured including a source of energizing voltage, means to derive from said source a second unidirectional E. M. F. of magnitude which varies in accordance with the variations in magnitude of said energizing voltage, a circuit connection to oppose said E. M. F.'s to derive a differential E. M. F., physically stationary means controlled directly and electrically by said differential E. M. F. to regulate the magnitude of said second mentioned E. M. F. to reduce the magnitude of said differential E. M. F., and a bridge circuit having its equalizing terminals connected in said circuit connection and its energizing terminals connected in circuit with said energizing voltage source to introduce an E. M. F. in said circuit connection to compensate for variation in said first mentioned E. M. F. due to variations in the temperature of the cold junctions of said thermocouple and to compensate for variations in said second mentioned E. M. F. due to variations in the magnitude of said energizing voltage, said bridge circuit having means connected therein which is responsive to the cold junction temperature of said thermocouple and is responsive to the magnitude of said energizing voltage.

22. Measuring apparatus including a unidirectional E. M. F. which is variable in magnitude and which varies in magnitude in accordance with the variations in magnitude of a variable condition, a unidirectional E. M. F. to be measured, a circuit connection to oppose said E. M. F.'s derive a differential E. M. F., means to vary said first mentioned E. M. F. to reduce said differential E. M. F. to a minimum value, means to measure the magnitude of said first mentioned E. M. F., and means in said circuit connection to compensate for variations in said first mentioned unidirectional E. M. F. due to variations in said variable condition.

23. Measuring apparatus including a source of energizing voltage, means to derive from said source a unidirectional E. M. F. of magnitude which varies in accordance with the variations in magnitude of said energizing voltage, a unidirectional E. M. F. to be measured, a circuit connection to oppose said E. M. F.'s to derive a differential E. M. F., means to vary said first mentioned E. M. F. to reduce said differential E. M. F. to a minimum value, means to measure said first mentioned E. M. F., and a bridge circuit having its equalizing terminals connected in said circuit connection and its energizing terminals connected in circuit with said source to introduce an E. M. F. in said circuit connection to compensate for variations in said first mentioned E. M. F. due to variations in the magnitude of said energizing voltage, said bridge circuit having means connected therein responsive to the magnitude of said energizing voltage and operative to control the state of balance of said bridge circuit.

24. Measuring apparatus including a source of energizing voltage, means to derive from said source a unidirectional E. M. F. of magnitude which varies in accordance with the variations in magnitude of said energizing voltage, a unidirectional E. M. F. to be measured which varies in magnitude in accordance with the variations in magnitude of a plurality of variable conditions, a circuit connection to oppose said E. M. F.'s to derive a differential E. M. F., means to vary said first mentioned E. M. F. to reduce said differential E. M. F. to a minimum value, means to measure said first mentioned E. M. F., and means connected in said circuit connection to compensate for variations in said first mentioned E. M. F. due to variations in said energizing voltage and to compensate for variations in said second mentioned E. M. F. due to variations in at least one of said variable conditions.

25. Measuring apparatus including a source of energizing voltage, means to derive from said source a unidirectional E. M. F. of magnitude which varies in accordance with the variations in magnitude of said energizing voltage, a thermocouple subjected to a variable temperature condition to be measured and producing a unidirectional E. M. F. varying in accordance with the variations in the temperature condition, a circuit connection to oppose said E. M. F's. to derive a differential E. M. F., means to vary said first mentioned E. M. F. to reduce said differential E. M. F. to a minimum value, means to measure first mentioned E. M. F., and a bridge circuit having its equalizing terminals connected in said circuit connection and its energizing terminals connected in circuit with said energizing voltage source to introduce a compensating E. M. F. into said circuit connection. said bridge circuit having means connected therein responsive to the magnitude of said energizing voltage and responsive to the cold junction temperature of said thermocouple and operative to control the state of balance of said bridge circuit in such manner that the compensating E. M. F. introduced into said circuit connection is effective to compensate for the variations in said first mentioned E. M. F. due to variations in magnitude of said energizing voltage and to compensate for the variations in said second mentioned E. M. F. due to variations in the cold junction temperatures of said thermocouple.

26. Measuring apparatus including a first unidirectional E. M. F. which is variable in magnitude and which varies in magnitude in accordance with the variations in magnitude of a variable condition, a second unidirectional E. M. F. to be measured and which varies in magnitude in accordance with the variations in a plurality of variable conditions, a circuit connection to oppose said first and second unidirectional E. M. F.'s to derive a differential E. M. F., means responsive to said differential E. M. F. to vary the magnitude of said first mentioned unidirectional E. M. F. to reduce said differential E. M. F., said last mentioned means including means to compensate for variations in said first unidirectional E. M. F. due to variations in said first mentioned variable condition, and means in said circuit connection to compensate for variations in said second unidirectional E. M. F. due to variations in at least one of said variable conditions.

27. Measuring apparatus including a first unidirectional E. M. F. which is variable in magnitude and which varies in magnitude in accordance with the variations in magnitude of a variable condition, a second unidirectional E. M. F. to be measured and which varies in magnitude in accordance with the variations in a plurality of variable conditions, a circuit connection to oppose said first and second unidirectional E. M. F's. to derive a differential E. M. F., means including intermittently operating means connected in said circuit connection to convert the differential E. M. F. into a fluctuating E. M. F., means including a high gain electronic amplifier to amplify said fluctuating E. M. F. and to utilize the amplified quantity to vary the magnitude of said first mentioned unidirectional E. M. F. to reduce said differential E. M. F. and which operates to compensate for variations in said first unidirectional due to variations in said first mentioned variable condition, and means in said circuit connection to compensate for variations in said second unidirectional E. M. F. due to variations in at least one of said variable conditions.

28. Measuring apparatus including a first unidirectional E. M. F. which is variable in magnitude and which varies in magnitude in accordance with the variations in magnitude of a variable condition, a second unidirectional E. M. F. to be measured, means to oppose said first and second unidirectional E. M. F's. to derive a differential E. M. F., and means responsive to said differential E. M. F. to vary the magnitude of said first mentioned unidirectional E. M. F. to reduce said differential E. M. F., said last mentioned means including means to compensate for variations in said first unidirectional E. M. F. due to variations in said variable condition.

29. Self balancing apparatus for measuring the magnitude of a unidirectional E. M. F. including a second variable unidirectional E. M. F. which varies in magnitude in accordance with the variations in magnitude of a variable condition, a circuit connection to oppose said E. M. F's. to derive a differential E. M. F., and physically stationary means controlled directly and electrically by said differential E. M. F. to regulate the magnitude of said second mentioned E. M. F. to reduce the magnitude of said differential E. M. F., said last mentioned means including means to compensate for variations in said second mentioned E. M. F. due to variations in said variable condition.

30. Self balancing apparatus for measuring the magnitude of a unidirectional E. M. F. including a second variable unidirectional E. M. F. which varies in magnitude in accordance with the variations in magnitude of a variable condition, a circuit connection to oppose said E. M. F's. to derive a differential E. M. F., means including intermittently operating circuit interrupting means connected in said circuit connection to convert the differential E. M. F. into a fluctuating E. M. F., and physically stationary means including a high gain electronic amplifier for amplifying said fluctuating E. M. F. to regulate the magnitude of said second mentioned E. M. F. to reduce the magnitude of said differential E. M. F.

31. Self balancing apparatus for measuring the magnitude of a unidirectional E. M. F. including a source of energizing voltage, means to derive from said source a second unidirectional E. M. F. of magnitude which varies in accordance with the variations in magnitude of said energizing voltage, a circuit connection to oppose said E. M. F's. to derive a differential E. M. F., means including intermittently operating circuit interrupting means connected in said circuit connection to convert the differential E. M. F. into a fluctuating E. M. F., and means including an electronic amplifier the gain of which approaches infinity to amplify said fluctuating E. M. F. and to utilize said amplified quantity to control said first mentioned means to regulate the magnitude of said second mentioned E. M. F. to reduce the magnitude of said differential E. M. F.

HARRY S. JONES.